United States Patent [19]
Gamble et al.

[11] Patent Number: 5,777,420
[45] Date of Patent: Jul. 7, 1998

[54] SUPERCONDUCTING SYNCHRONOUS MOTOR CONSTRUCTION

[75] Inventors: Bruce B. Gamble, Wellesley; Gregory L. Snitchler, Shrewsbury, both of Mass.

[73] Assignee: American Superconductor Corporation, Westborough, Mass.

[21] Appl. No.: 682,923

[22] Filed: Jul. 16, 1996

[51] Int. Cl.$^6$ ........................................................ H02K 9/00
[52] U.S. Cl. ............................. 310/261; 310/52; 310/54; 310/10; 310/19; 310/269
[58] Field of Search ............................ 310/91, 52, 61, 310/10, 261, 59, 198, 54, 269; 505/211, 230, 231

[56] References Cited

U.S. PATENT DOCUMENTS

| | | | |
|---|---|---|---|
| 2,423,345 | 7/1947 | Roters | 310/261 |
| 3,470,396 | 9/1969 | Kafka | 310/10 |
| 3,492,516 | 1/1970 | Fujiwara et al. | 310/67 |
| 3,916,229 | 10/1975 | Litz et al. | 310/52 |
| 4,058,746 | 11/1977 | Mole et al. | 310/10 |
| 4,146,804 | 3/1979 | Carr, Jr. | 310/52 |
| 4,398,108 | 8/1983 | Danilevich et al. | 310/54 |
| 4,462,152 | 7/1984 | Okamoto et al. | 29/598 |
| 4,739,200 | 4/1988 | Oberly et al. | 310/10 |
| 4,739,202 | 4/1988 | Hatanaka et al. | 310/52 |
| 4,816,708 | 3/1989 | Laumond | 310/52 |
| 5,030,863 | 7/1991 | Yoshimura et al. | 310/52 |
| 5,506,198 | 4/1996 | Sato | 505/211 |
| 5,532,663 | 7/1996 | Herd et al. | 335/216 |
| 5,548,168 | 8/1996 | Laskaris et al. | 310/52 |

*Primary Examiner*—Steven L. Stephan
*Assistant Examiner*—Tran N. Nguyen
*Attorney, Agent, or Firm*—Fish & Richardson P.C.

[57] ABSTRACT

A rotor assembly for use within a superconducting electric motor includes a superconducting winding formed of high temperature superconductor and during operation, generates a flux path within the rotor assembly; and a high permeability magnetic material, positioned within at least a portion of the flux path so as to decrease the overall reluctance of the flux path. The rotor assembly may include a support member having an internal volume and formed of a non-magnetic, high-strength resilient material. The support member supports on its outer surface the superconducting winding and within its internal volume, the high permeability magnetic material. The magnetic material may be in the form of a core member to provide the low reluctance portion to the flux path generated by the superconducting winding.

18 Claims, 5 Drawing Sheets

SUPERCONDUCTING SYNCHRONOUS MOTOR CONSTRUCTION

BACKGROUND OF THE INVENTION

The invention relates to superconducting synchronous motors and their construction.

Iron has been utilized in the field structures of conventional dynamoelectric machines in order to obtain sufficient magnetic flux at critical points of the machines (e.g., within the windings).

At the same time, efforts have been ongoing in applying cryogenic technology to dynamoelectric machines. The use of superconducting windings in these machines has resulted in a significant increase in the field magnetomotive forces generated by the windings and increased flux and power densities of the machines.

However, most ferromagnetic materials, including iron, are brittle causing them to fracture easily under the influence of the oscillatory forces generated in dynamoelectric machinery. Furthermore, the brittleness characteristic of such materials becomes worse when cooled to cryogenic temperatures. Thus, in some applications, the use of ferromagnetic materials in machines having superconducting windings is often severely limited and, at a minimum, presents non-trivial problems to the designer.

SUMMARY OF THE INVENTION

The invention features a rotor construction for an electric motor in which high-permeability magnetic material is positioned with respect to a superconducting winding to reduce the reluctance of the flux path produced by the superconducting winding.

In a general aspect of the invention, a rotor assembly for use within a superconducting electric motor includes a superconducting winding which is formed of high temperature superconductor and, during operation, generates a flux path within the rotor assembly; and a high permeability magnetic material, positioned within at least a portion of the flux path so as to decrease the overall reluctance of the flux path generated by the superconducting winding.

In a presently preferred embodiment of the invention, the rotor assembly includes a support member having an internal volume and is formed of a non-magnetic, high-strength resilient material. The support member supports on its outer surface the superconducting winding. The internal volume of the support member supports the magnetic material which is formed as a cylindrically shaped core. The core member provides a low reluctance to a portion of the flux path generated by the superconducting winding.

The construction of the rotor assembly offers significant advantages. The superconducting windings are supported on the outside of the support member with the windings extending beyond the ends of the support member and core member. The support member effectively captures the core member, so that, in certain applications, the core member can be cryogenically cooled without significant risk of its fracturing due to oscillatory forces generated by the machine during operation. Thus, the invention provides an internally-supported structure which protects the relatively brittle components (i.e., core member). Moreover, the rotor assembly design generates higher flux levels for a given number of ampere-turns of the windings, resulting in a more efficient motor. Thus, the size of the structure can be reduced without sacrificing performance.

Further, unlike many relatively complicated conventional designs in which ferromagnetic materials are positioned in the armature of the motor or embedded within the superconducting region of the windings, the rotor assembly of the invention provides a relatively simple construction which is spatially removed from the superconductor region, while still augmenting the magnetic field generated by the superconducting windings.

In preferred embodiments, the rotor assembly described above may include one or more of the following features. The support member may be formed as a cylindrical tube formed of stainless steel having an outer surface which in cross section has a stepped profile for supporting the windings. The core may be formed of iron and may be cylindrically shaped to substantially fill the internal volume of the cylindrical tube.

The magnetic material forming the core may be cryogenically cooled. In this case, the core is generally captured in radial compression within the internal volume of the torque tube. The core may be formed as a series of stacked laminations, each lamination lying in a plane perpendicular to the longitudinal axis of the cylindrical tube. Thus, any cracks which may form in one or more of the laminations are prevented from propagating through the core structure.

Alternatively, in a rotor construction in which the iron core is maintained at warm (non-cryogenic) temperatures, the iron core may be a solid continuous member. In this application, the core is generally spaced from the support member by a vacuum gap to thermally isolate the support member from the core. The vacuum gap may be filled with a multi-layered insulation.

The rotor assembly may include an outer electromagnetic shield member surrounding the superconducting winding and support member. The superconducting winding is racetrack-shaped and is formed of high temperature superconductor (HTS).

In still another aspect of the invention, a method of providing a rotor assembly for a synchronous motor includes providing a core material formed of a high permeability magnetic material; disposing a support member formed of a non-magnetic, high-strength resilient material around the core material; and positioning a superconducting armature winding on an outer surface of the support member.

In preferred embodiments, the step of providing the core material includes stacking laminations formed of high permeability magnetic material. The step of disposing a support member around the core material includes shrinking the support member around the core material.

Other advantages and features will become apparent from the following description and the claims.

DESCRIPTION OF THE PREFERRED EMBODIMENTS

Figure 1:
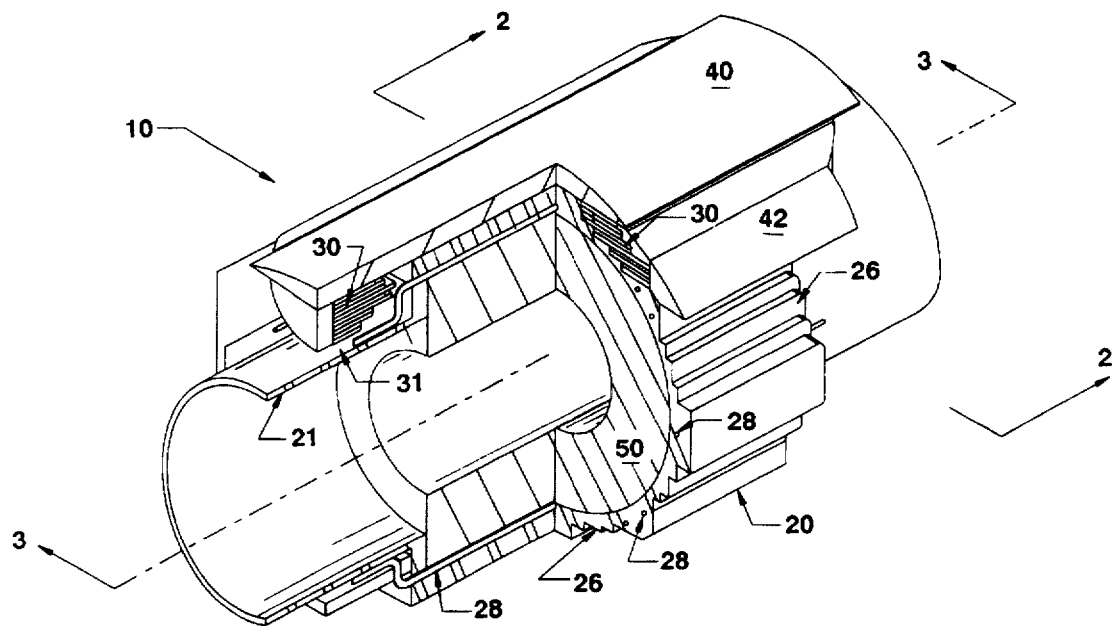
FIG. 1 is an isometric, partially cut-away view of a rotor for a superconducting synchronous machine.
Figure 2:
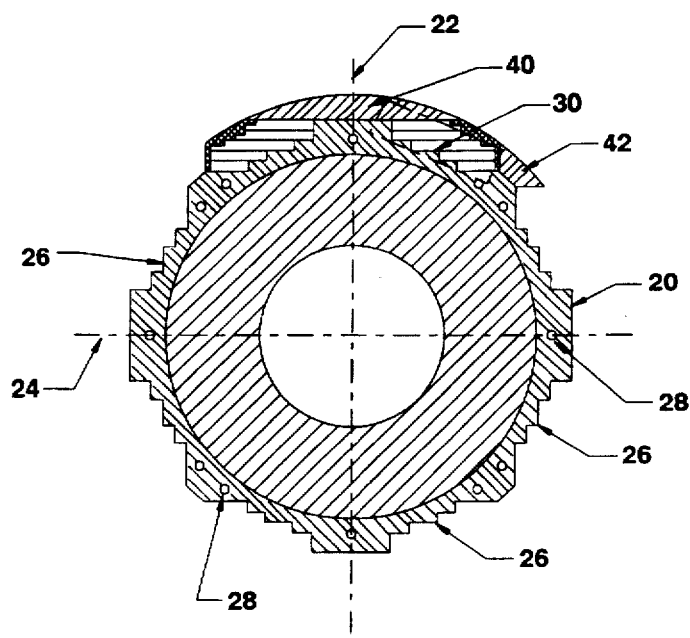
FIG. 2 is a cross-sectional end view of a portion of the rotor of FIG. 1 taken along lines 2—2 of FIG. 1.
Figure 3:
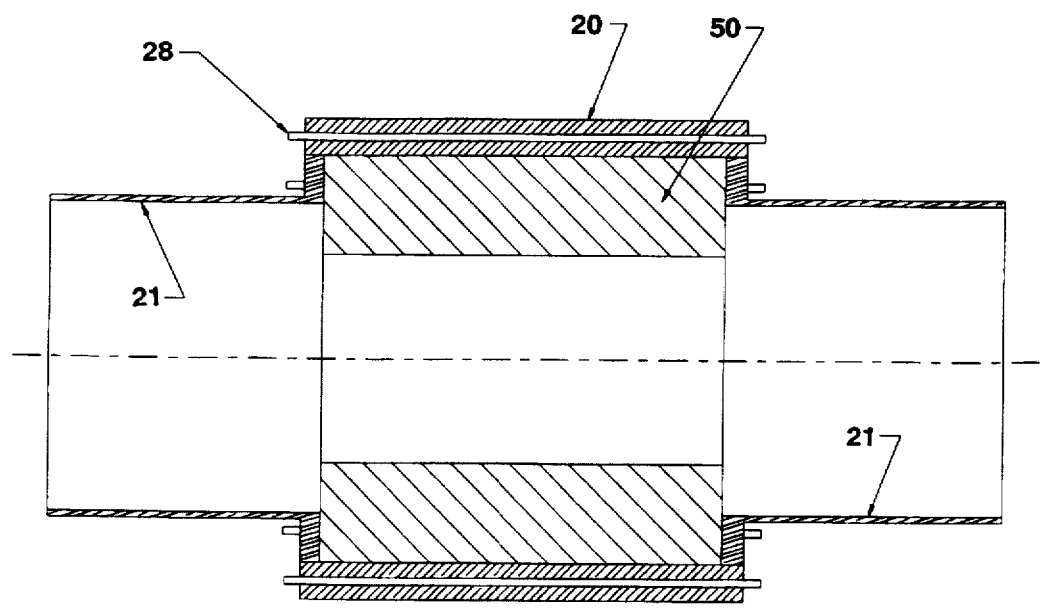
FIG. 3 is a cross-sectional side view of a portion of the rotor of FIG. 1 taken along lines 3—3 of FIG. 1.

Referring to FIGS. 1–3, a rotor assembly 10 for a synchronous motor having a four-pole topology is shown without its outer shield which encloses the vacuum layer within the overall assembly. The rotor assembly includes a torque tube 20 fabricated from a high-strength, ductile and non-magnetic material (e.g., stainless steel). The outer surface of the torque tube 20 supports four superconducting winding assemblies 30 (only one shown here), each winding associated with a pole of the motor. A hollow core member 50 is positioned within the inner volume of the torque tube and whose function will be discussed in greater detail below. Core member 50 is fabricated from a material having a high permeability, high saturation flux density and good magnetic characteristic (e.g., iron). To reduce the weight of the core and, therefore, the overall weight of the assembly, the thickness of the hollow iron core 50 is generally selected to provide a low reluctance flux path while maintaining the iron core below its over-saturated point. In other applications, where the weight of the rotor assembly is of little concern, the iron core may be solid.

Referring particularly to FIG. 2, each of a first diametrically opposing pair of the superconducting windings is wound about a first axis 22. Each of a second diametrically opposing pair of the winding is wound about a second axis 24, transverse to axis 22. The windings are supported along the outer periphery of the tube at stepped profiles 26 formed along axes 22, 24. Moreover, as shown most clearly in FIG. 1, the windings extend beyond the end of the iron core and torque tube. At these end regions, the windings are spaced from the torque tube by a vacuum layer 31 which is generally filled with multi-layered insulation (e.g., layers of aluminized mylar). This arrangement ensures that the windings are maintained at their cryogenic temperature while allowing the length of the rotor assembly and motor to be decreased.

The torque tube 20 includes end extension members 21 which define warm/cold transition regions between the ambient environment and the cryogenically cooled portion of the rotor assembly. The torque tube 20 also includes a number of cooling ducts 28 which extend through the length of the torque tube and carry liquid or gas refrigerants needed for cooling the superconducting winding assemblies (FIG. 3). The winding assemblies 30 are secured to the torque tube 20 by pole caps 40 attached at the four polar positions of the rotor and with quadrature caps 42 equally spaced and offset 450° from axes 22, 24 between each pole cap. The pole and quadrature caps are generally fabricated from the same material as the torque tube and, together with the torque tube, form a complete cylinder.

Figure 4:
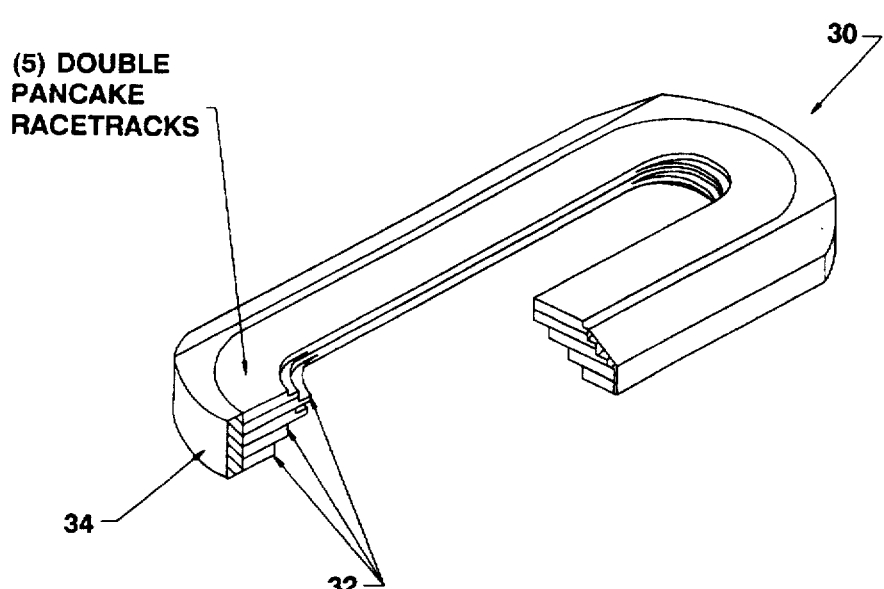
FIG. 4 is an isometric, partially cut away view of a racetrack superconducting winding for use with the superconducting synchronous machine of FIG. 1.

Referring to FIG. 4 each superconducting winding assembly 30 is associated with each pole of the motor and includes racetrack double "pancake" coils 32 positioned within a coil support shell 34. Each double pancake coil has co-wound conductors wound in parallel which are then stacked coaxially on top of each other. In this embodiment, the conductor is a high temperature copper oxide ceramic superconducting material, such as $Bi_2Sr_2Ca_2Cu_3O_x$, commonly designated BSCCO 2223. As shown here, one or more of the double pancake coils 32 may include a pancake coil having a diameter smaller than its associated pancake coil of the double pancake, the two coils of a pair being wound from the same continuous length of superconducting tape. An approach for using this approach is described in co-pending application Ser. No. 08/541,639 which is assigned to the assignee of the present invention and attached herein as an appendix.

The preferred embodiments are based on the magnetic and thermal properties of high temperature superconducting composites, preferably including superconducting ceramic oxides and most preferably those of the copper oxide family. The warm and cold iron embodiments cannot be economically justified for low temperature superconductors in part because the addition of iron to the rotor has a significant cost for superconducting motors. Use of the iron rotor does reduce the amount of the superconducting composite used by about 50%. Because high temperature superconducting composites are expensive to manufacture and typically contain large amounts of expensive noble metals, this reduction of superconducting material in the rotor substantially reduces the cost of a high temperature superconducting motor. In contrast, a 50% reduction of low temperature superconducting material has a insignificant cost benefit to such a device, since the cooling cost, not the material cost, is the primary consideration. The cost of cooling to the vicinity of about 4°K. (for low temperature superconductors) is high in comparison to the cost of cooling to about 27°K. (for high temperature superconductors), particularly when the necessity of compensating for eddy currents is factored in.

Figure 5:
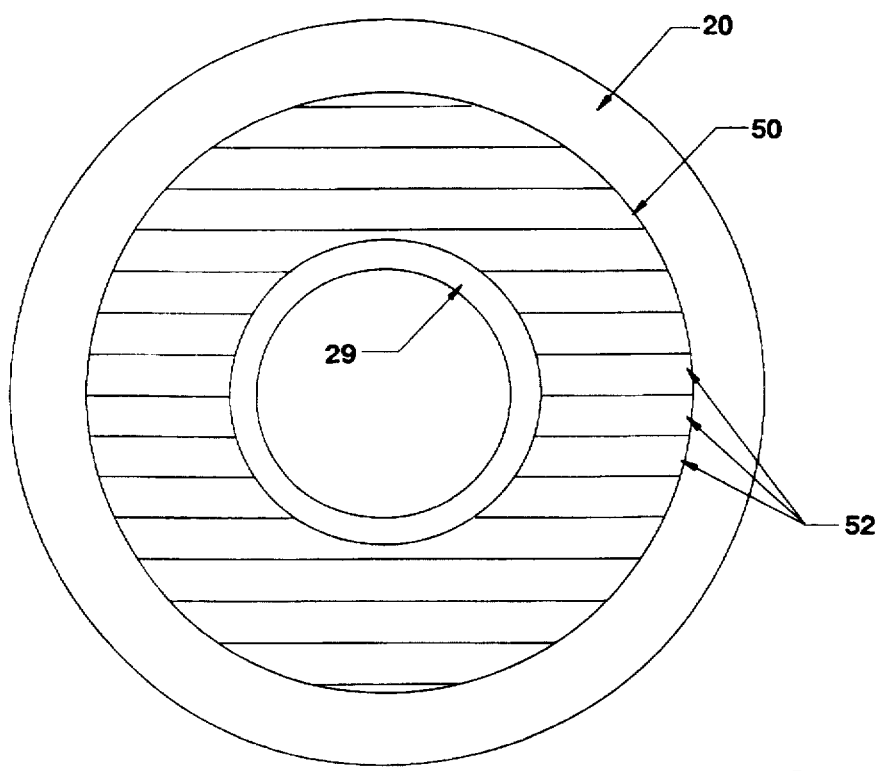
FIG. 5 is a cross-sectional end view of the magnetic core of the rotor assembly.

Referring to FIG. 5, in a preferred embodiment, the iron core is formed as a series of stacked laminations 52. The high strength torque tube is typically heated to allow the tube to thermally expand. The stacked laminations 52, which may be cooled, are placed within the inner volume of the tube in its heated state. The torque tube is then allowed to cool so that the tube shrinks around the laminations capturing them in a compressed state within the tube. The torque tube may also be "shrink welded" to preload the stainless steel tube around the iron core. In another embodiment, shown in FIG. 5, the iron core 50 is captured in radial compression between the torque tube 20 and an inner sleeve 29.

Although a solid iron core member may be used, a stacked set of laminations is preferable so that, in the event that one of the laminations cracks, the crack is isolated to that lamination and will not propagate to neighboring laminations. Cracking in the iron core 50 is a serious concern because the non-ductile iron core is cryogenically cooled along with the superconducting windings 30. At these low temperatures, the brittleness characteristic of the iron is increased. In order to increase the ductile strength of the laminated structure in the radial direction, reinforcing layers (e.g., fiberglass or stainless steel) may be placed between the laminations. The laminations and reinforcing layers can then be impregnated with, for example, epoxy.

Figure 6:
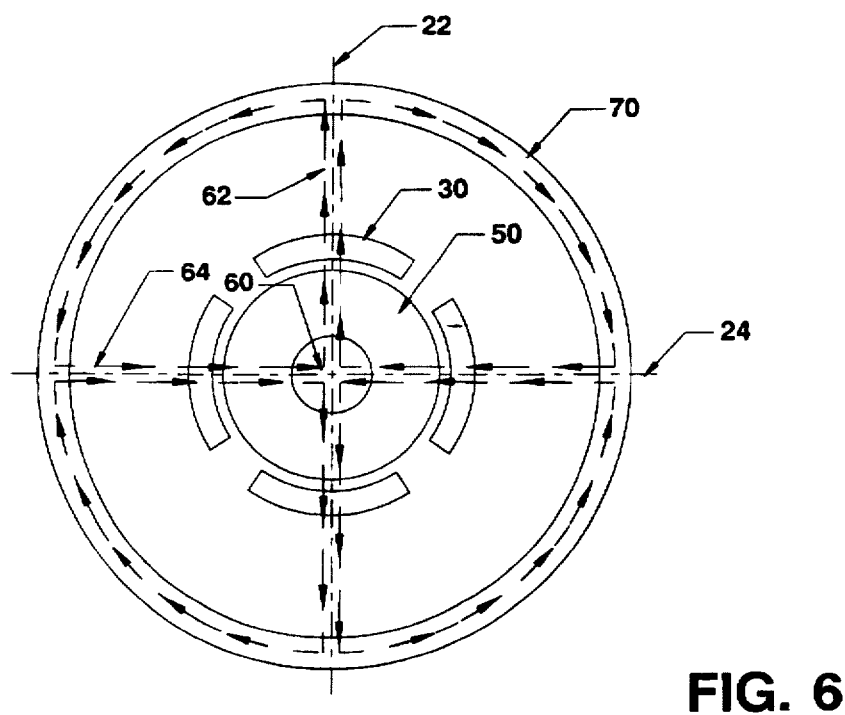
FIG. 6 is a diagrammatic representation illustrating the flux paths in the superconducting synchronous machine.

Positioning the iron core 50 within the torque tube provides significant advantages in the operation of the synchronous motor. In order to appreciate these advantages, a simplistic representation of the flux paths generated by each of the superconducting windings is shown in FIG. 6. One of the four flux paths corresponding to the upper left-hand quadrant, starts at a point 60 in the iron core, extends in a path 62 running generally parallel with axis 22 until it encounters the back iron member 70 which provides a low impedance path. At this point, the flux path extends counterclockwise through the back iron member and, then back along a path 64 parallel to axis 24 toward point 60 to close the loop. The flux paths for the remaining quadrants extend away from the iron core, through the back iron member and back to the iron core in similar fashion. It is apparent from FIG. 6, therefore, that a significant portion of the flux path passes through the iron core positioned within the inner volume of the torque tube. Because iron is a high permeability, high saturation flux density material it acts, in a sense, as a magnetic short circuit so as to reduce the overall reluctance of the flux path and increase the amount of flux generated for a given number of ampere-turns of the windings. Thus, a lower-loss magnetic circuit is provided resulting in a more efficient motor.

Figure 7:
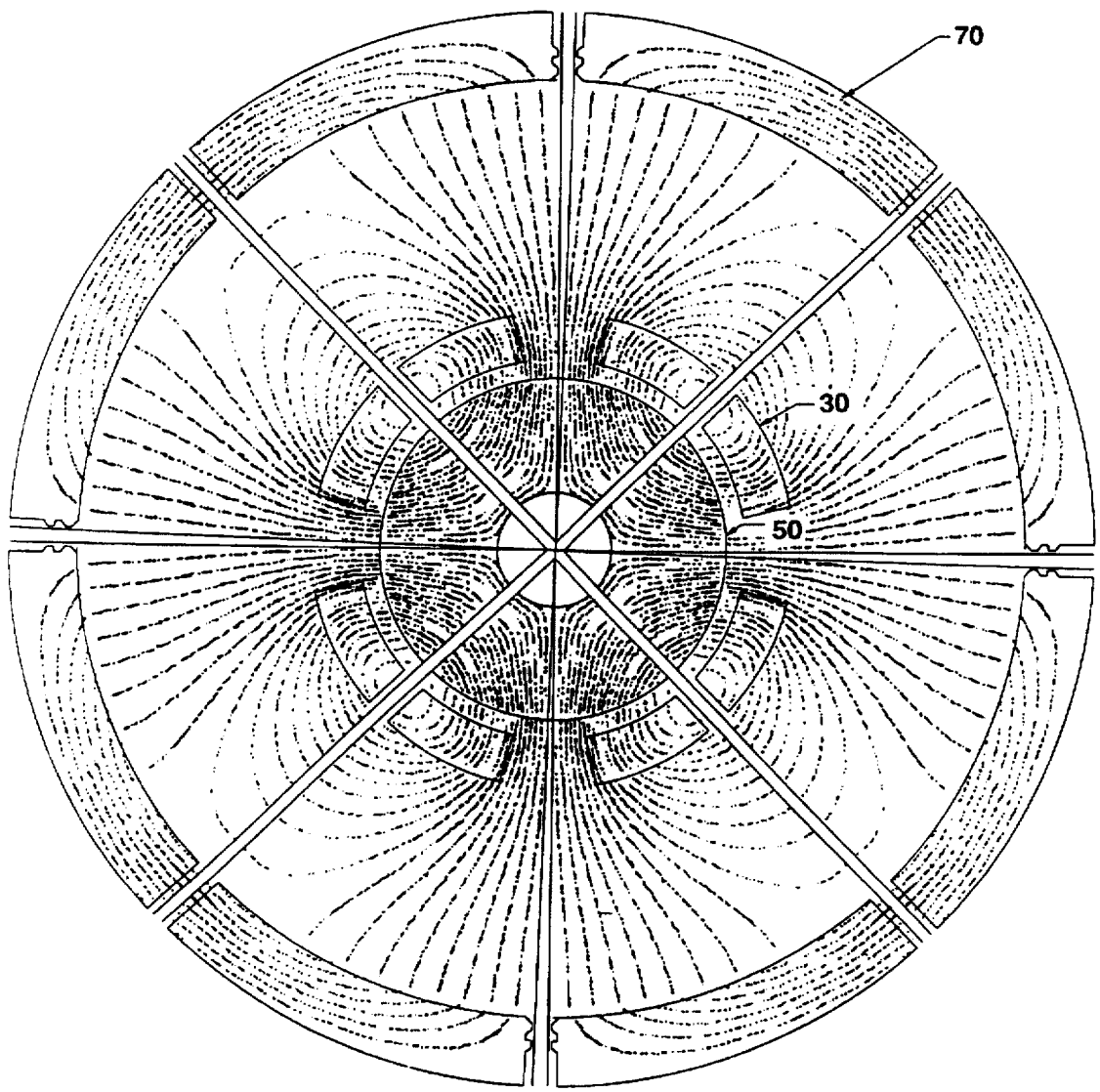
FIG. 7 is a plot showing the magnetic field distribution within the rotor assembly.

Referring to FIG. 7, a plot showing the magnetic field distribution within the rotor assembly shows the increased flux flowing through the iron core 50.

Referring to the table below, the characteristics of rotor assembly designs for a pair of 5,000 horsepower synchronous superconducting motors one of which includes an air core with other having an iron core, are presented.

| 5000 hp design air core | 5000 hp design iron rotor |
|---|---|
| ampere turns 422,000 a | 230,000 a (all other terms the same) |
| rotor: | |
| inner radius 7.2 in | |
| outer radius 8.2 in | |
| pole angle 14 degrees | |
| straight 30 inches poles 4 | |
| stator: | |
| slots 72 | |
| inner radius 10.5 in. | |
| phases 3 | |
| backiron: | |
| inner radius 13.6 | |

The iron core rotor assembly design requires 45% less ampere-turns than the air core design to produce the same level of flux. Thus, the amount of superconducting wire required for the windings is reduced, thereby significantly lowering the cost and cooling requirements of the motor.

Figure 8:
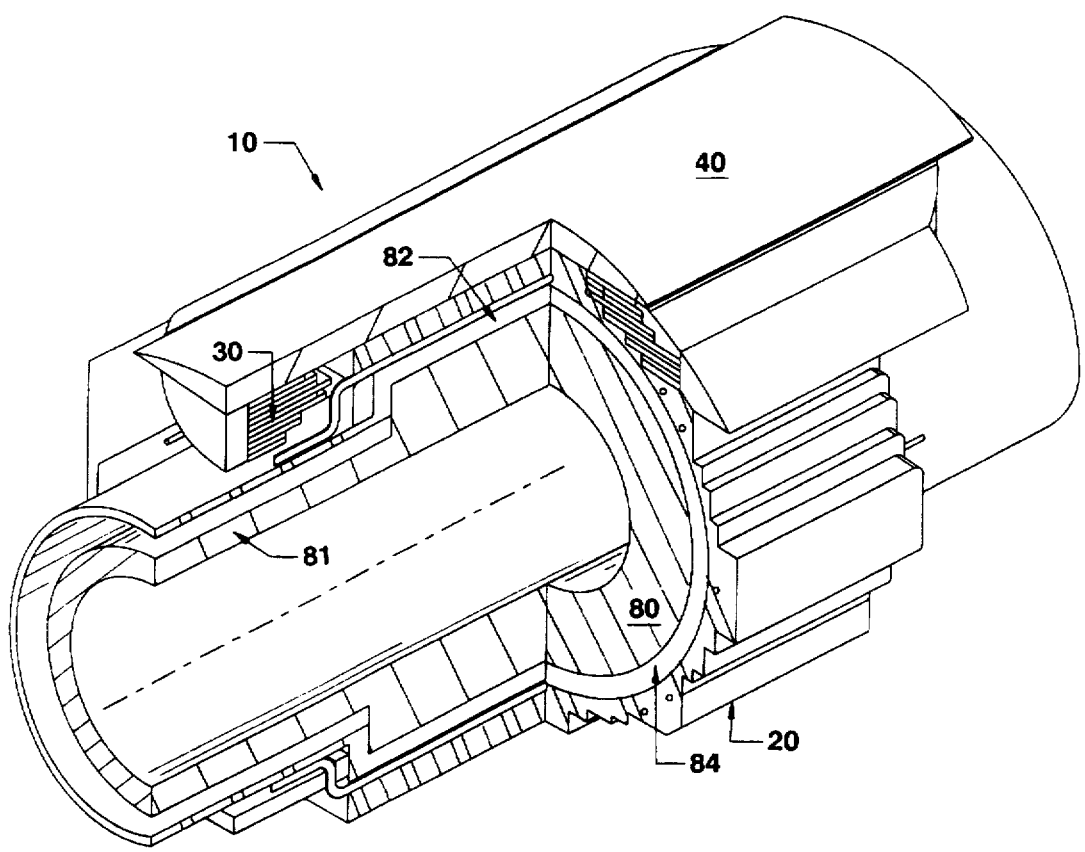
FIG. 8 is an isometric, partially cut-away view of an Alternate embodiment of a superconducting synchronous machine.
Figure 9:
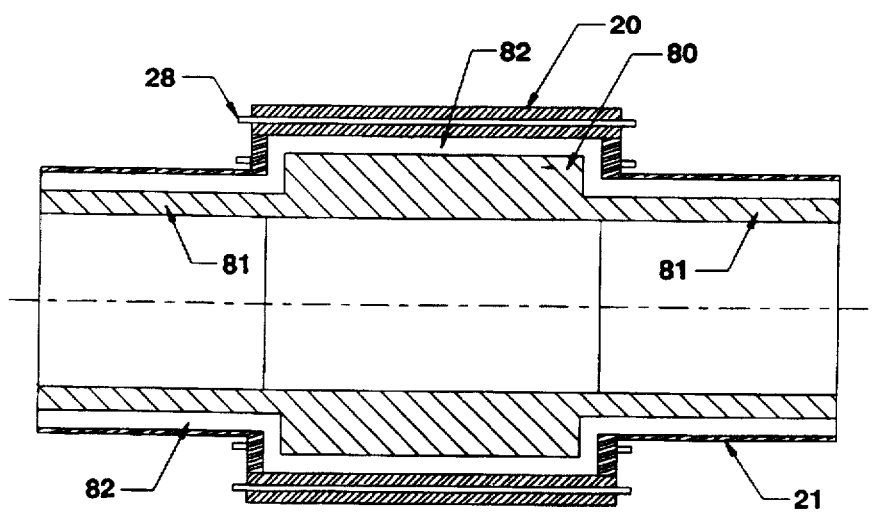
Fig. 9 is a cross-sectional view of the embodiment of FIG. 8.

Referring to FIGS. 8 and 9, in another embodiment, an iron core 80 is spaced from the inner wall of the torque tube 20 which is cryogenically cooled. Here, the iron core, is not cooled but is thermally isolated from the tube by an annular vacuum gap 82. The vacuum gap may be air-filled, but is preferably filled with multi-layered insulation 84 to minimize heat leaking. As shown more clearly in FIG. 9, the iron core 80 is formed with extensions 81 which extend commensurately with torque tube extensions 21. In many applications, multi-layered insulation layers are positioned within the vacuum gap 82 to increase the thermal isolation between the iron core and support member. Because the iron core 80 is not maintained at cryogenic temperatures, it is substantially more ductile. Thus, it no longer becomes necessary for the torque tube 20 to capture the iron core in a compressed state as was the case in the embodiments described above in conjunction with FIGS. 1–3. Moreover, the advantages associated with forming the iron core as a series of laminations are lessened where the core is maintained at ambient temperatures.

Other embodiments are within the following claims.

What is claimed is:

1. A rotor assembly for use within a superconducting electric motor comprising:

at least one superconducting winding formed of high temperature superconductor, the superconducting winding, during operation, generating a flux path within the rotor assembly;

a support member having an inner surface which defines an internal volume and an outer surface, the support member formed of a non-magnetic, high-strength resilient material, said outer surface having a discontinuous cross-sectional profile for supporting the superconducting winding; and a high permeability magnetic material, positioned within the internal volume of the support member and at least a portion of the flux path so as to decrease the overall reluctance of the flux path generated by the superconducting winding.

2. The rotor assembly of claim 1 wherein the high permeability magnetic material substantially fills the internal volume of the support member.

3. The rotor assembly of claim 1 wherein the support member is formed as a cylindrical tube and the high permeability magnetic material forms a cylindrically shaped core.

4. The rotor assembly of claim 1 wherein the magnetic material is cryogenically cooled.

5. The rotor assembly of claim 1 wherein the magnetic material is thermally isolated from the superconducting winding.

6. The rotor assembly of claim 5 wherein the support member is spaced from the magnetic material by a vacuum gap.

7. The rotor assembly of claim 1 wherein the support member includes an outer surface which in cross section has a stepped profile.

8. The rotor assembly of claim 3 wherein the core is formed as a plurality of laminations, each lamination lying in a plane perpendicular to the longitudinal axis of the cylindrical tube.

9. The rotor assembly of claim 3 wherein the core material is formed as a continuous member.

10. The rotor assembly of claim 1 wherein the magnetic material is iron.

11. The rotor assembly of claim 1 wherein the superconducting winding is formed of high temperature superconductor (HTS).

12. The rotor assembly of claim 1 wherein the superconducting winding is a racetrack shaped winding.

13. The rotor assembly of claim 1 further comprising an outer electromagnetic shield member surrounding the superconducting winding and support member.

14. The rotor assembly of claim 1 wherein the support member is formed of stainless steel.

15. The rotor assembly of claim 1 wherein the superconducting electric motor is a synchronizing motor.

16. A rotor assembly for a superconducting electric motor comprising:

a support member having an inner surface which defines an internal volume and an outer surface, the support member formed of a non-magnetic, high-strength resilient material, said outer surface haaving a discontinous cross-sectional profile for supporting a superconducting winding which, in operation, generates a flux path within the rotor assembly; and a core member disposed within the internal volume of the support member and formed of a high permeability magnetic material, the core member decreasing the overall reluctance of the flux path generated by the superconducting winding.

17. The rotor assembly of claim 11 wherein the high temperature superconductor is a superconducting ceramic oxide.

18. The rotor assembly of claim 17 wherein the superconducting ceramic oxide is of the copper oxide family.

* * * * *